Oct. 4, 1932.  R. G. WULFF  1,880,306

METHOD OF PRODUCING HIGH TEMPERATURES

Filed Dec. 27, 1927

INVENTOR:
Robert G. Wulff,
BY
ATTORNEY.

Patented Oct. 4, 1932

1,880,306

UNITED STATES PATENT OFFICE

ROBERT G. WULFF, OF LOS ANGELES, CALIFORNIA

METHOD OF PRODUCING HIGH TEMPERATURES

Application filed December 27, 1927. Serial No. 242,832.

My invention relates to furnaces, and more particularly to a novel method of producing high temperatures in such a furnace.

Certain chemical processes require that a liquid or gas be subjected to high temperatures in order that they may be cracked. One method of effecting this cracking is to pass the liquid or gas through a mass of previously heated particles formed of a suitable refractory material, these particles giving up some of their heat to the liquid or gas passing therethrough. It is impossible to thus continuously crack the liquid or gas, inasmuch as the particles soon become cool. It is common practice to reheat these particles by passing a burning combustible mixture therethrough. The maximum temperature to which the particles may be raised is, of course, determined by the temperature of the products of combustion, a feature which precludes the use of such a furnace in processes requiring the production of extremely high temperatures. In certain processes, I have found it desirable to still further heat the burning combustible mixture to extremely high temperatures, these superheated products then raising the temperature of the particles much further.

It is an object of my invention to provide a furnace in which a body of particles is heated to a temperature higher than that obtainable through the burning of a commercially used combustible material with air.

It is possible to attain temperatures higher than those derived from the usual air and gas or oil combustion by the use of an electric arc. The temperatures derived from this medium are, however, very difficult to control accurately. High temperatures may also be produced by the passage of an electric current through a resistance wire. Such a heat-producing means is easily controlled, but the maximum temperatures obtainable are limited by the properties of the wire, the best resistance wire known at the present time being impractical for my purpose before producing temperatures comparable with those produced by an electric arc. I have found it possible to use a porous body, formed of suitable refractory material, as a heating unit by passing an electric current therethrough, this current causing the body to attain extremely high temperatures. Any gas or liquid substance may be passed through the pores of this heated porous body, and being subjected to actual contact with the body may be thus heated to very high temperatures. Furthermore, the temperatures obtained are readily controllable by varying the amount of current passing through the porous body.

It is an object of my invention to provide a method of and apparatus for producing extremely high temperatures, these temperatures being readily controllable.

Another object of my invention is to provide a method of electrically raising the temperature of a substance by passing the substance through a porous body which is heated by the passage therethrough of an electric current.

I have found certain compounds of silicon or other refractory materials to be extremely useful in making such porous bodies. Recrystallized carborundum serves this purpose admirably, provided it is first heated to a temperature at which it becomes a good enough conductor of electricity. This required preliminary temperature is easily obtainable through the burning of a combustible material either in or adjacent to the porous body. The products of this combustion travel therethrough and then through a particle-filled chamber, thus heating the particles therein. By passing an electric current through the porous body, any combustion therein is accelerated, and the products of combustion are raised to extremely high temperatures, these products heating the particles in the chamber to high temperatures.

It is an object of my invention to provide a method of obtaining high temperatures, by instigating combustion in or near a porous body, and subsequently accelerating this combustion and raising the products of combustion to high temperatures by the passage of an electric current through the body.

Another object of my invention is to provide a method of creating a furnace temperature which is higher than the temperature of the products of a combustion mixture burning therein.

Still a further object of my invention is to provide a furnace which is very efficient in operation.

A still further object is to provide a furnace having walls forming a treating chamber, these walls being effectively heat-insulated and so mounted as to allow for expansion thereof.

Further objects and advantages of my invention will be made hereinafter.

Referring to the drawing in which I show a preferred form of my invention,—

Figure 1:
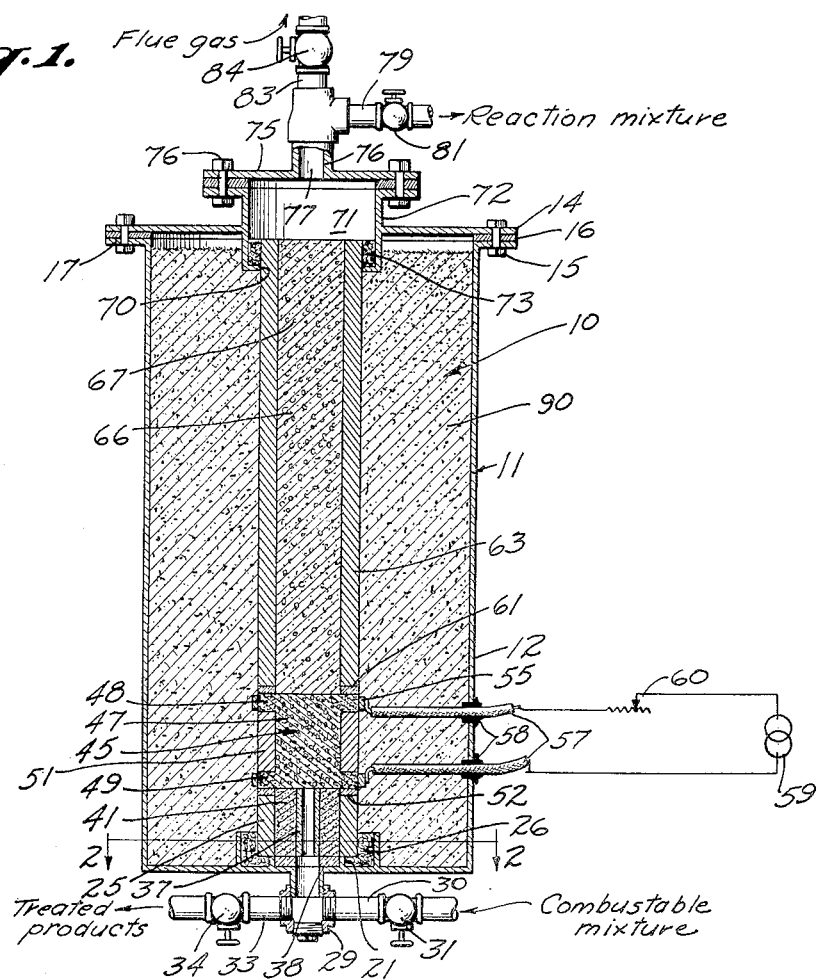
Fig. 1 is a vertical cross-section of the furnace of my invention.
Figure 2:
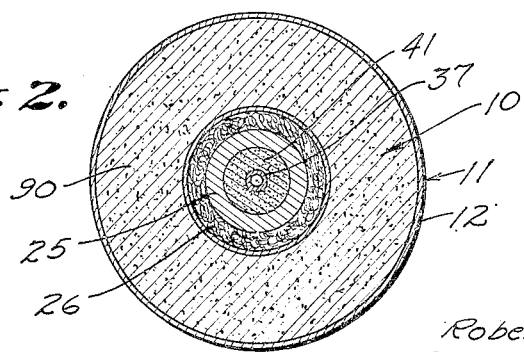
Fig. 2 is a cross-sectional view taken on the line 2—2 of Fig. 1.

Referring in particular to the drawing, the furnace 10 has a shell 11, this shell comprising a cylindrical wall 12 closed at its lower end by a plate 13. The upper end of the cylindrical wall 12 is closed by a cover 14 clamped thereto by bolts 15, there being packing 16 between the cover and a lip 17 of the wall 12 through which the bolts extend.

Extending upward from the plate 13 is an outer lip 20 which is cylindrical in shape. Also extending upward from the plate 13 is a supporting lip 21 which is concentric with the outer lip 20 and the cylindrical wall 12. Resting on the supporting lip 21 is a lower tube 25 of suitable refractory material. I prefer to use a fired carborundum tube of close texture for this purpose, but other refractory tubes may be used with equal success. The space between the supporting lip 21 and the outer lip 20 is filled with a packing 26 which is made of asbestos or other heat-resisting material.

Extending downward from the plate 13 concentric with the axis of the lower tube 25 is a nipple 28 having a T fitting 29 secured thereto. Screwed into the T fitting 29 is a combustible-mixture pipe 30 having a valve 31 therein. Also extending from the T fitting 29 is a treated-products pipe 33 having a valve 34 therein. These pipes 30 and 33 are adapted to communicate with a sleeve 37 supported on a washer 38 in the space defined by the supporting lip 21. The sleeve 37 is made of a suitable heat-resisting material and is spaced centrally in the lower tube 25. The space between the sleeve 37 and the lower tube 25 is filled with a suitable heat-resisting material 41 which is preferably in the form of a powder such as powdered silica.

Resting upon the top of the sleeve 37 is the spool-shaped porous plug 45 of my invention. This plug has a cylindrical body 47 which is substantially of the same diameter as the inner diameter of the lower tube 25. At the upper and lower ends of the cylindrical body 47 are formed annular rims 48 and 49. The plug 45 is preferably formed of recrystallized carborundum, although other materials having the requisite properties of ability to withstand extremely high temperatures, electrical conductivity at these high temperatures, and a porous texture, may be used. The cylindrical body 47 of the porous plug 45 is quite open in character so that gases or other material may easily pass therethrough. The rims 48 and 49, however, are much less porous so that any gas or other material passing through the cylindrical body 47 cannot easily escape through these ribs. An intermediate tube 51 surrounds the cylindrical body 47 and is placed between the rims 48 and 49, this intermediate tube having inner and outer diameters which are substantially the same as the diameters of the lower tube 25. The lower rim 49 is separated from the upper edge of the lower tube 25 by a body of suitable fire-clay cement 52.

Surrounding each of the rims 48 and 49 is an electrode 55 formed of a suitable electrical conductor capable of withstanding extremely high temperatures. Such electrodes 55 may conveniently be of nickel. Connected to each electrode 55 is a wire 57, these wires passing through the cylindrical wall 12 of the shell 11 through insulators 58, and being connected to a suitable source of electrical potential 59. I prefer to insert a rheostat 60 between one of the wires 57 and the source of electrical potential, this rheostat serving the purpose of regulating the amount of current through the wires 57 and the porous plug 45.

Spaced above the upper rim 48 by a body of fire-clay cement 61 is an upper refractory tube 63. This upper tube 63 has inner and outer diameters substantially the same as the lower tube 25 and is made of a suitable refractory material capable of withstanding high temperatures. I have found that a closely formed fired carborundum tube has particular utility in this connection. The upper tube 63 defines a treating chamber 66, which is filled with a body of particles 67, this body of particles having a porosity substantially equal to the porosity of the cylindrical body 47 of the porous plug 45.

The upper end of the upper tube 63 extends through an opening 70 in a lower wall of a chamber 71 defined by a cylindrical wall 72 of the cover 14. Packing 73 is placed between the wall 72 and the upper end of the tube 63, thus allowing for expansion of the tube 63 when heated. The upper end of the chamber 71 is defined by a plate 75, this plate being suitably held in position by bolts 76. The plate 75 has a projection 76 having an opening 77 communicating with a fitting 78. The fitting 78 receives a reaction-mixture pipe 79 having a valve 81 therein, and also receives a flue-gas pipe 83 having a valve 84 therein, these pipes 79 and 83 communicating with the chamber 71 and thus with the treating chamber 66.

The space between the shell 11 and the tubes 25, 51 and 63 is almost completely filled with a suitable insulating material 90 which serves the dual purpose of preventing an escape of heat from the tubes and also supporting these tubes in the shell in a manner that allows for expansion thereof.

One method of operating the furnace of my invention is as follows:

The valves 34 and 81 are closed and the valves 31 and 84 are opened. At this time a combustible mixture is forced through the combustible-mixture pipe 30, this mixture passing through the sleeve 37 to the porous plug 45. This combustible mixture is ignited in the plug 45 and burns either in the porous plug 45 or in the lower portion of the treating chamber 66, forming products of combustion which rise in the treating chamber 66 between the particles 67 therein. These products of combustion pass into the chamber 71, thence through the flue-gas pipe 83. It should be apparent that the temperature of the particles 67 will be raised through direct contact with the products of combustion and that the temperature of the particles in the lower portion of the treating chamber 66 will be much higher than the temperature in the upper portion thereof. The temperature of the cylindrical body 47 of the porous plug 45 will be still higher than the temperature of the particles 67 in the lower portion of the treating chamber 66 and under these conditions it is, of course, impossible to raise the temperature of the plug 45 above that obtainable by the theoretrically perfect combustion of the combustible mixture.

In order to heat the products of combustion to a still higher temperature to form a heating mixture, an electrical potential is established between the electrodes 55 of the porous plug. This plug is a conductor when raised to the temperature of the products of combustion and the current established passes longitudinally through the plug, the resistance of the plug forming a means of generating large amounts of heat. By controlling the amount of current passing therethrough, it is possible to attain extremely high temperatures of the products of combustion, these products of combustion when heated still further being termed a heating mixture, this heating mixture passing through the treating chamber 66 and raising the temperature of the particles 67 therein to extremely high values.

When the temperatures in the treating chamber 66 have reached the desired values, the valves 84 and 31 are closed and the valves 81 and 34 are open, thus allowing a reaction mixture to pass through the pipe 79 into the chamber 71 and through the particles in the treating chamber 66, this reaction mixture also passing through the body of the porous plug 45 and escaping through the sleeve 37 to the treated-products pipe 33.

There are many chemical and physical processes in which it is advantageous to so treat a reaction mixture, one of them being the formation of acetylene from natural gas. In this case, the natural gas passes through the reaction-mixture pipe 79 and is heated in the treating chamber 66, the degree of heat depending upon its position in the heating chamber and the temperature to which the particles have previously been raised. The acetylene, together with other products, is formed during the passage of the natural gas through the treating chamber 66 and the porous plug 45 and passes through the treat-products pipe 33 to a suitable supplementary apparatus which is not a part of this invention.

It should be noticed that the reaction mixture is subjected to relatively low temperatures at the top of the treating chamber 66, but is raised in temperature as it passes downward therein, the highest temperature being reached when passing through the porous plug 45.

It is possible to leave the electrodes 55 connected to the electric circuit at all times, even while the reaction gas is passing through the treating chamber. This tends to hold the temperature of the porous plug constant and gives an extremely uniform product.

A further and very important advantage of my invention is the economy effected in attaining extremely high temperatures. It is universally recognized that gas heat is much cheaper than heat produced by the passage of electric current through a resistance or a carbon arc. In the furnace of my invention the combustible mixture supplied through the pipe 30 supplies a primary heat to the plug 45 and the particles 67, and the electrical current passing through the plug 45 supplies a secondary heat to the heating mixture passing upward through the treating chamber 66. It is thus necessary to use only the amount of electrical energy required to raise the temperature of the products of combustion to a point sufficiently high to form the desired heating mixture, instead of generating the total amount of heat through electrical means, as has heretofore been the case. Furthermore, the rate of change of temperature of a body of particles being heated through combustion rapidly falls off as the upper limit of temperature is approached. Thus, my invention also effects a distinct saving of time inasmuch as electrical energy can be supplied to the plug when these temperatures are reached, this electrical energy rapidly heating the plug and the substance passing therethrough.

While my furnace has a particular utility in intermittent flows of combustible material, and reaction mixtures, it is within the scope of my invention to use the combined combustible and electrical means for obtaining high temperatures in any other apparatus or process where its use might be advantageous.

The idea of burning a combustible mixture in a porous plug and still further heating the products formed by means of an electrical current passing through the porous plug is very valuable in many heating arts. The material passing through the plug is brought into direct surface contact with the material of the plug through which the current is passing, and thus receives by direct contact the heat generated in the plug 45. Thus much higher temperatures can be attained in this manner than if the heat is supplied through suitable conducting walls separating a resistance unit and the material to be treated. The porous plug 45 of my invention is also simple and relatively cheap to manufacture and will not decompose or burn out with continued use.

The furnace of my invention may also be used advantageously by primarily heating the particles through the burning of a combustible material, then stopping the flow of this material through the pipe 30, and finally heating the plug by electrical means. In this manner the temperature of the body of particles is not raised materially above the combustion temperature. The reaction gas must, however, pass through the porous plug before being exhausted from the furnace. This method of operation is disadvantageous in performing certain processes inasmuch as the reaction gas is subjected to a decided rise in temperature as it enters the porous plug. In other processes, however, such a quick rise in temperature is decidedly advantageous.

I claim as my invention:

1. An intermittent endothermic process which comprises burning a gas mixture containing oxygen and an oxidizable gas within the interstices of a porous refractory material, then after the porous material has been heated to a high temperature, electrically heating said porous material until a further materially higher temperature is reached, then discontinuing the flow of said mixture and electricity, and then passing a gas or vapor which reacts endothermically through said porous material.

2. An intermittent endothermic process which comprises burning a gas mixture containing oxygen and an oxidizable gas within the interstices of a porous refractory material, then after the porous material has been heated to a high temperature, electrically heating said porous material until a further materially higher temperature is reached, then discontinuing the flow of said mixture and electricity, and then passing a gas or vapor which reacts endothermically through said porous material in a direction countercurrent to that in which the combustible mixture was passed.

3. A cyclical intermittent endothermic process which comprises burning a gas mixture containing oxygen and an oxidizable gas within the interstices of a porous refractory material, then after the porous material has been heated to a high temperature, electrically heating said porous material until a further materially higher temperature is reached, then discontinuing the flow of combustible gas or vapor and air or oxygen mixture and electricity, and then passing a gas or vapor which reacts endothermically through said porous material in a direction countercurrent to that in which the combustible mixture was passed.

4. A process according to claim 1 in which the electrical heating is continued while the endothermic reaction takes place.

5. An intermittent endothermic process which comprises burning a gas mixture containing oxygen and an oxidizable gas within the interstices of a porous refractory material until a high temperature is reached, then discontinuing the combustion but electrically heating the refractory material until a further increased temperature is reached, then discontinuing the electric current, and then passing a gas or vapor which reacts endothermically through said porous material.

6. An intermittent endothermic process which comprises burning a combustible gas mixture containing oxygen and an oxidizable gas within the interstices of a porous refractory material until a high temperature is reached, then discontinuing the combustion but electrically heating the refractory material until a further increased temperature is reached, then discontinuing the electric current, and then passing a gas or vapor which reacts endothermically through said porous material in a direction which is countercurrent to that in which the combustible mixture was passed.

7. A cyclical intermittent endothermic process which comprises burning a combustible gas mixture containing oxygen and an oxidizable gas within the interstices of a porous refractory material until a high temperature is reached, then discontinuing the combustion but electrically heating the refractory material until a further increased temperature is reached, then discontinuing the electric current, and then passing a gas or vapor which reacts endothermically through said porous material until the efficiency of the reaction is materially reduced, and then repeating the cycle over and over again.

8. A process according to claim 5 in which the electrical heating is continued while the endothermic reaction takes place.

9. An intermittent endothermic process which comprises burning a combustible gas mixture within the interstices of a porous refractory material which is also an electrical conductor of high resistance, then after the porous material has been heated to a high temperature, passing electric current through said porous material until a further materially higher temperature is reached, then discontinuing the flow of the combustible gas mixture and electric current, and then passing a gas or vapor which reacts endothermically through said porous material.

In testimony whereof, I have hereunto set my hand at Los Angeles, California, this 20th day of December, 1927.

ROBERT G. WULFF.